UNITED STATES PATENT OFFICE.

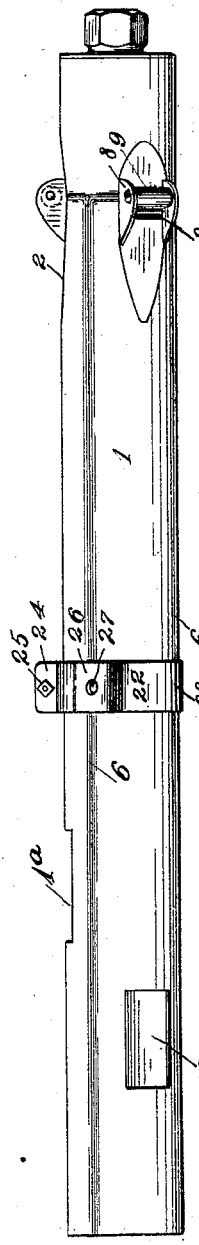

CLAUD H. FOSTER, OF CLEVELAND, OHIO.

HORN.

No. 907,765.   Specification of Letters Patent.   Patented Dec. 29, 1908.

Application filed April 26, 1907. Serial No. 370,478.

*To all whom it may concern:*

Be it known that I, CLAUD H. FOSTER, a citizen of the United States, residing at Cleveland, in the county of Cuyahoga and State of Ohio, have invented a certain new and useful Improvement in Horns, of which the following is a full, clear, and exact description, reference being had to the accompanying drawings.

My invention relates to horns, and particularly to chime horns of the type shown in my Patent No. 803,386, issued Oct. 24th, 1905, and has for its object to simplify and improve the construction and mode of operation of such horns.

Generally speaking, the invention may be defined as consisting of the combinations of elements embodied in the claims hereto annexed.

Referring to the drawings, Figure 1 represents an elevation of one form of horn embodying my invention; Fig. 2 a perspective view of a modified form of such horn; Fig. 3 an enlarged sectional detail of the operating end of the horn taken on the line 3—3 of Fig. 4; Fig. 4 is an elevation of such end of the horn; and Fig. 5 an enlarged sectional view on the line 5—5 of Fig. 3, looking in the direction of the arrows.

The horn consists of an outer casing or shell 1 of sheet metal, preferably brass, said shell being preferably cylindrical in shape throughout its length, except where indented to form the inclined surfaces 2, 12$^a$, and mouths 3.

Instead of employing several separate horn tubes for producing a chime or chord, as shown in my patent hereinbefore referred to, I make the casing or shell 1 of sufficient diameter to accommodate one or more partitions, 4, 4$^a$, 4$^b$, extending longitudinally thereof and dividing the casing or shell into as many compartments, 5, 5$^a$, and 5$^b$, as may be desirable. In the drawings, I have shown three such compartments, although a greater or less number may be provided if desired.

The horn shown herein resembles in its general features of construction the horn disclosed in my pending application No. 312,297, filed April 18th, 1906.

The partitions may be formed of sheet metal with their outer edges seated in recesses 6, which are formed in the inner surface of the horn body and extend longitudinally thereof, providing external ribs, as shown more particularly in Figs. 1, 4 and 5. In forming several compartments, as shown in the drawings, two of the partitions may be formed from an integral sheet the members of which are bent at a suitable angle with respect to each other and the central portion whereof is provided with a recess 4$^c$ for the reception of the central edge of a third partition, as 4$^a$.

The partitions extend from the "front" or open end of the horn to a transverse partition 7 adjacent to the "rear" or operating end of the horn, and the ends of such partitions may be suitably secured to the transverse partition, as by brazing.

Each compartment 5, 5$^a$, and 5$^b$ comprises a horn body, the outer shell of which is provided with an inclined surface 2, mouth 3, ears 8 and a cross member 9, the construction at the mouth and the arrangement of the ears 8 and cross member 9 with relation thereto being substantially the same as in the case of my Patent No. 803,386 hereinbefore referred to and Patent No. 808,530 issued December 26th, 1905. With the several horn compartments, I employ a common transverse partition 7, as illustrated in Figs. 3 and 5. This partition conforms to the inner contour of the shell 1 and is secured thereto as by brazing, except in proximity to the mouths 3, where it is cut away to provide narrow slits 10 between the edge thereof and the rear lips 11, the edge being serrated.

The portion of the outer shell which extends rearwardly from the lips 11 is of sufficient length to provide an expansion and distributing chamber common to all of the horn members and is preferably flattened immediately to the rear of said lips, as shown at 12, to permit free and proper access of air below the cross member 9, the flattened portion extending rearwardly beyond the cross member and preferably as far as the rear ends of the ears 8, at which location it merges with a tapered surface 12$^a$ which merges with the body of the rear portion of the shell forming the outer casing of the expansion chamber. I have found it necessary to employ the flattened portion 12$^a$ extending about parallel with the axis of the horn in order to admit air properly to the cross member 9 and preserve the pitch of the horn under varying pressures of fluid. At the same time, the provision of the inclined or tapered surface 12$^a$ forms a connection between the flattened portion 12 and the cylindrical body of the expansion chamber.

In order to supply pressure fluid to the multiple horn, I provide the rear end of the shell 1 with an integral thread preferably formed in a bushing 13 either integral with said casing or brazed thereto. To the rear end of said horn is fitted a head, said head comprising a plate 14 having a suitably arranged nipple 15 for supplying pressure fluid to the rear of the horn. The nipple is provided with a thread 16 for attachment to the exhaust of an automobile or other source of pressure fluid supply. The head 14 is adapted to abut against the rear end of the casing and close the same, and is provided with an externally threaded sleeve 17, whereby it may be secured into the bushing 13. This permits easy removal of the head and connection for the purpose of obtaining access to the chamber 18 formed at the rear of the partition 7, for the purpose of cleaning the same. As horns of the type herein described are generally carried on the outside of an automobile, where they are unprotected from dust, etc., the provision of this ready means for cleaning the horn is of great advantage.

The chamber formed between the head 14 and the partition 7 is greatly elongated over the chambers which are employed with the individual horns shown in my patents hereinbefore referred to. This provides an expansion chamber for the gases which are discharged through the inlet connection 16, and this chamber serves to equalize the pressure of the intermittent charges of the gases which are supplied thereto from the engine exhaust and to produce a continuous tone from the horn. It also cools the gases prior to their discharge therefrom, produces a better distribution of the gases to the horn members, and provides a space of sufficient depth to accommodate a strainer 19 which extends from a shoulder 20 formed at the inner end of the internal thread 16 to the partition 7. This strainer is preferably tubular in form, as shown, and is provided with a sufficient number of small perforations 21 to admit the gases to the chamber 18 without any throttling and consequent production of a back pressure upon the engine in excess of that produced by the provision of the inlet connection 16 and the slits 10 provided between partition 7 and the adjacent portions of the outer shell. At the same time it removes from the gases all carbon and other impurities which might clog the slits 10 or otherwise impair the efficiency and operation of the horn. The strainer thus provides an unobstructed passageway for the pressure fluid therethrough, as any obstruction produced by the strainer will not be in excess of the obstruction produced by the inlet or by the narrow slits 10, provided between the partition 7 and the horn casing.

The varying pitch of the horn members necessary to produce a chime or chord when the horn is operated as a whole is produced by varying the effective lengths of the constituent members thereof. This may be accomplished by providing each of the horn members but the longest with a large opening $1^a$ formed in the casing 1, whereby the effective length of the horn member extends only to the rear end of the opening. At the same time, it enables me to employ for the multiple horn a single tube of substantially uniform dimensions from front to rear, and the complete horn thus formed presents a sightly appearance. I may, however, produce the desired chime effect by cutting off the outer casing or shell between the branches of the longitudinal partitions to provide separate horn bodies of varying length. In Fig. 2, I have shown a horn so constructed. I also prefer to extend the partition branches 4, $4^a$, $4^b$ from the center of the casing in such manner as to divide the same into compartments of unequal cross-sectional area. The compartment 5, corresponding to the horn member of shortest length, is the smallest in area; compartment $5^a$, which belongs to the horn member of next greater length, is of somewhat greater area than compartment 5; while compartment $5^b$, which corresponds to the horn member of greatest length, is of greatest area.

It will be observed that the compartments 5, $5^a$ and $5^b$ are supplied respectively through slots of corresponding size, as appears more particularly from inspection of Fig. 5, and that the cross bars are also of corresponding length. This causes each horn member to receive from the distributing chamber 18 its proper proportion of gases in order to insure the sounding of all the horn members simultaneously and with uniform loudness alike under high and low pressures. With the form of horn shown in Fig. 2 there is a further advantage in that, owing to the greater extent of the outer surface of the shell which corresponds to the compartment $5^b$, by placing a horn with such compartment on the side remote from the vehicle the ends of the other horn members are substantially concealed thereby.

The manner of fitting the partitions together and into the horn casing not only forms an effective means for retaining the partitions in place, but accomplishes the result in a very inexpensive manner. Furthermore, the ribs which are provided in the horn casing in the process of forming seats for the partitions provide means whereby the horn may be rigidly and economically attached to the automobile. In conjunction with the ribs, I employ a strap 22 which is provided with complementary recesses 23 for the reception of said ribs and with lugs 24 for the reception of a bolt 25, whereby the strap may be secured firmly to the horn body with the ribs 6 in engagement with the corresponding recesses in the strap. The strap 23 is provided with a flattened portion 26 provided with an aperture 27 whereby the horn may be secured to the vehicle. By this construction, the horn may be firmly secured in place.

It will be noted that I employ a screw 28 extending through the ears 7 and through the interior of the hollow cross bar or member 9. This is for the purpose of temporarily retaining the member in position and at the same time enabling it to be adjusted to such position as will enable the pitch of the horn member to be maintained. After said cross member has been adjusted, it may be secured permanently in place by means of soft solder in addition to the screw.

Having described my invention, I claim:

1. A horn comprising a casing having adjacent to one end thereof a partition and a head removably fitted to said end of the horn and forming with such partition a chamber, said head being provided with an inlet for pressure fluid, and a tubular strainer carried by said head and extending from said inlet to said partition, substantially as specified.

2. A multiple horn comprising a casing having at one end thereof a head provided with an inlet for pressure fluid, a partition extending transversely of said casing and forming, with said head, a distributing chamber for said fluid, one or more longitudinal partitions in said casing extending between the open end thereof and said transverse partition and dividing said casing into a plurality of horn compartments, each compartment having adjacent to said transverse partition a mouth, and a tubular strainer extending from said inlet to said partition, said chamber being of such depth as to provide an unobstructed passageway for the pressure fluid through the strainer, substantially as specified.

3. A horn comprising a casing having at one end thereof a head provided with an inlet for pressure fluid, a partition extending transversely of said casing and forming, with said head, a distributing and expansion chamber for such fluid, such casing having adjacent to said partition a mouth, a slit being provided between said partition and the casing adjacent to said mouth, and a tubular strainer extending from said inlet into said chamber and provided with fine perforations, the perforated area of said strainer being greater than the area of said slit.

4. A multiple horn comprising a casing having at one end an inlet for pressure fluid, a partition extending transversely of said casing and forming with such end of the casing a chamber, said casing being provided on its interior with longitudinal recesses, a longitudinal partition having its outer edges fitted into said recesses and dividing the horn into a plurality of compartments, said horn having a mouth corresponding to each compartment and being provided with means for directing the pressure fluid from said chamber into operative relation to said mouths, substantially as specified.

5. A multiple horn comprising a casing having at one end an inlet for pressure fluid and having its other end open, a partition extending transversely of said casing and forming with the closed end of the casing a chamber, said casing being provided on its interior with longitudinal recesses, a longitudinal partition having its outer edges fitted into said recesses and extending between the open end thereof and the transverse partition and dividing the horn into a plurality of compartments, said horn having a mouth corresponding to each compartment and being provided with means for directing the pressure fluid from said chamber into operative relation to said mouths, substantially as specified.

6. A multiple horn comprising a casing having one end open and the other end provided with a head for pressure fluid, a partition extending transversely of said casing and forming with the head a distributing chamber for pressure fluid, one or more longitudinal partitions in said casing and extending between the open end thereof and said transverse partition and dividing the casing into a plurality of horn compartments, said compartments being of different effective lengths, the compartments of greatest length being also of greatest cross sectional area, each of said compartments being provided, adjacent to the transverse partition, with a mouth, slits being provided between the transverse partition and the portions of the casing adjacent to said mouths for the supply of pressure fluid from the distributing chamber to said mouths, substantially as specified.

7. A horn comprising a casing, said casing being provided with external ribs extending longitudinally thereof, the interior of the horn being provided with recesses complementary to said ribs, partitions fitted in said recesses and dividing the horn into compartments, said horn having a distributing chamber common to said compartments and an inlet connection for pressure fluid, and a band for said casing having recesses positioned to receive the ribs on the exterior thereof, substantially as specified.

8. A horn comprising a casing having one end open and the other end provided with a head having an inlet for pressure fluid, a partition forming with said head a distributing chamber for such fluid, said casing being provided with a mouth adjacent to said partition, a pair of ears located respectively on opposite sides of said mouth, a cross member extending between said ears, and a screw extending through said member and through said ears, substantially as specified.

9. A horn for automobiles and the like comprising a casing having one end open and the other end provided with a head having an inlet for pressure fluid, a transverse partition forming with said head and casing an enlarged expansion and distributing chamber, one or more longitudinal partitions extending between the open end of the casing and the transverse partition and providing a plurality of horn compartments, said compartments being of different effective lengths, each of said compartments being provided with a mouth, and a slit for each mouth being provided between the transverse partition and the casing, substantially as specified.

10. A multiple horn comprising a casing having one end thereof open and the other end provided with a head having an inlet for pressure fluid, a partition extending transversely of said casing and forming, with the head, a distributing chamber for pressure fluid, one or more longitudinal partitions in said casing and extending between the open end thereof and said transverse partition and dividing the casing into a plurality of horn compartments, said compartments being of different effective lengths and of different cross-sectional areas the longest compartment being of the greatest cross-sectional area and each compartment having adjacent the transverse partition a mouth, ears on opposite sides of each of said mouths, a cross member supported by said ears, slits being provided between the transverse partition and the portions of the casing adjacent said mouths for the supply of pressure fluid from the common distributing chamber to said mouths, substantially as specified.

11. A horn comprising a casing having one end thereof open and the other end provided with a head having an inlet for pressure fluid, a partition extending transversely of said casing and forming with the head a distributing chamber for pressure fluid, one or more longitudinal partitions in said casing and extending between the open end of the same and the transverse partition and dividing the casing into a plurality of horn compartments having a common outer casing, the casing forming the outer wall of one or more of said compartments being slotted or interrupted to vary the effective lengths of said compartments, each of said compartments having adjacent the transverse partition a mouth, ears on opposite sides of said mouths, cross members supported by said ears, slits being provided between the transverse partition and the portions of the casing adjacent said mouths for the supply of pressure fluid from the distributing chamber to said mouths, substantially as specified.

12. A multiple horn comprising a casing having one end thereof open and the other end provided with a head having an inlet for pressure fluid, a partition extending transversely of said casing and forming with the head a distributing chamber for such pressure fluid, one or more longitudinal partitions in said casing and extending between the open end of the same and the transverse partition and dividing the casing into a plurality of horn compartments, said compartments being of different effective lengths, each of said compartments being provided with a mouth in front of the transverse partition, ears on opposite sides of each of said mouths, a cross member supported between each pair of ears, and a bushing in the rear end of said casing, said bushing having an internal thread, and said head being provided with an externally threaded flange adapting it to be screwed into said bushing.

13. A horn comprising a casing having one end open and the other end provided with a head having an inlet for pressure fluid, a transverse partition forming with said head and casing an expansion chamber for said fluid, and one or more longitudinal partitions extending between the open end of said casing and the transverse partition and dividing the casing into a plurality of horn compartments, each compartment being provided with a mouth in front of and adjacent to said transverse partition, slits being provided between said transverse partition and the casing for supplying fluid from the expansion chamber to said mouths, substantially as specified.

14. A horn comprising a casing having one end open and the other end closed and having an inlet for pressure fluid, a transverse partition spaced from said head and forming with the same and with the casing an expansion chamber, said casing having a mouth adjacent to said partition, said mouth comprising a front and a rear lip, and a cross member supported above the rear lip, the casing being flattened below said cross member, such flattened portion of the casing extending rearwardly from the rear lip in a direction substantially parallel to the axis of the horn and such flattened portion being connected with the body of the casing by an inclined portion which merges with the surface of the rear portion of the casing, substantially as specified.

15. A horn comprising a cylindrical casing having one end open and the other end closed and having an inlet for pressure fluid, a transverse partition spaced from said head and forming with the same and with the casing an expansion chamber, a longitudinal partition extending between the open end of the casing and the transverse partition and dividing the casing into a plurality of compartments, said casing having a mouth adjacent to said transverse partition for each of said compartments, said mouths each comprising a front and a rear lip, and a cross member supported above each rear lip, the casing being flattened below each cross member, such flattened portion extending rearwardly from the rear lip in a direction substantially parallel to the axis of the horn and being connected with the body of the casing by an inclined portion which merges with the surface of the rear portion of the casing, substantially as specified.

16. A multiple horn comprising a casing having one end closed and provided with an inlet connection for pressure fluid, a transverse partition forming with said closed end and the casing a distributing chamber for pressure fluid, said casing being provided with a plurality of longitudinal recesses in the interior thereof extending from the front end of the horn rearwardly toward such transverse partition, a longitudinal plate having its opposite edges fitted in two of said recesses and having a longitudinal recess at the central portion thereof, and a second longitudinal plate having the inner edge thereof fitted in the latter recess and the outer edge fitted in a recess of the casing, said casing being provided with a mouth for each compartment formed by the longitudinal plates, means being provided for supplying pressure fluid from the distributing chamber to said mouths.

17. A multiple horn comprising a casing having at one end an inlet connection and having its other end open; and a partition extending longitudinally of said casing from the open end thereof and dividing the same into a plurality of horn members, the portion of the casing forming the outer wall of one of said members being interrupted to vary the effective length of said member, substantially as specified.

In testimony whereof, I hereunto affix my signature in the presence of two witnesses.

CLAUD H. FOSTER.

Witnesses:
J. F. GIBLER,
J. D. COSTLOW.